United States Patent
Baudis

(10) Patent No.: US 8,747,573 B2
(45) Date of Patent: Jun. 10, 2014

(54) METHOD FOR PRODUCING CORROSION-RESISTANT SURFACES OF NITRATED OR NITROCARBURATED STEEL COMPONENTS

(75) Inventor: Ulrich Baudis, Alzenau (DE)

(73) Assignee: Durferrit GmbH, Mannheim (DE)

( * ) Notice: Subject to any disclaimer, the term of this patent is extended or adjusted under 35 U.S.C. 154(b) by 850 days.

(21) Appl. No.: 12/742,759

(22) PCT Filed: Oct. 29, 2008

(86) PCT No.: PCT/EP2008/009141
§ 371 (c)(1),
(2), (4) Date: May 13, 2010

(87) PCT Pub. No.: WO2009/074194
PCT Pub. Date: Jun. 18, 2009

(65) Prior Publication Data
US 2010/0243109 A1  Sep. 30, 2010

(30) Foreign Application Priority Data

Dec. 13, 2007 (DE) .......... 10 2007 060 085

(51) Int. Cl.
*C23C 22/70* (2006.01)
*C23C 22/50* (2006.01)
*C23C 8/50* (2006.01)

(52) U.S. Cl.
USPC ................. 148/242; 148/217; 148/287

(58) Field of Classification Search
USPC ............................. 148/217, 242, 287
See application file for complete search history.

(56) References Cited

U.S. PATENT DOCUMENTS

| 4,881,983 A * | 11/1989 | Smith et al. | 148/217 |
| 5,037,491 A * | 8/1991 | Fox | 148/209 |
| 2002/0038679 A1 | 4/2002 | Chomer et al. | |
| 2004/0040630 A1* | 3/2004 | Eiraku et al. | 148/217 |

FOREIGN PATENT DOCUMENTS

| DE | 692 00 127 T2 | 10/1994 |
| EP | 0 733 720 A1 | 9/1996 |

OTHER PUBLICATIONS

English-language translation of International Search Report dated Feb. 12, 2009, issued in parent International Application No. PCT/EP2008/009141.
DIN EN ISO 4287—Geometrical Product Specifications (GPS)—Surface texture: Profile Method—Terms, definitions and surface texture parameters (ISO 4287:1997+Cor. 1:1998+Cor. 2:2005+Amd. 1:2009), (includes Corrigendum AC:2008 and Amendment A1:2009), Nov. 2009.

* cited by examiner

*Primary Examiner* — Lois Zheng
(74) *Attorney, Agent, or Firm* — Venable LLP; Robert Kinberg

(57) ABSTRACT

The invention relates to a method for producing corrosion-resistant surfaces of nitrated or nitrocarburated steel components, the surfaces having roughness heights (Rz) of Rz≥1.5 μm. The method comprises the following steps: oxidation of the surfaces of the nitrated or nitrocarburated components in a first oxidation step; carrying out at least a second oxidation of the component surfaces in an immediately subsequent oxidation step; polishing the component surface in a final method step, directly after the final oxidation.

6 Claims, 2 Drawing Sheets

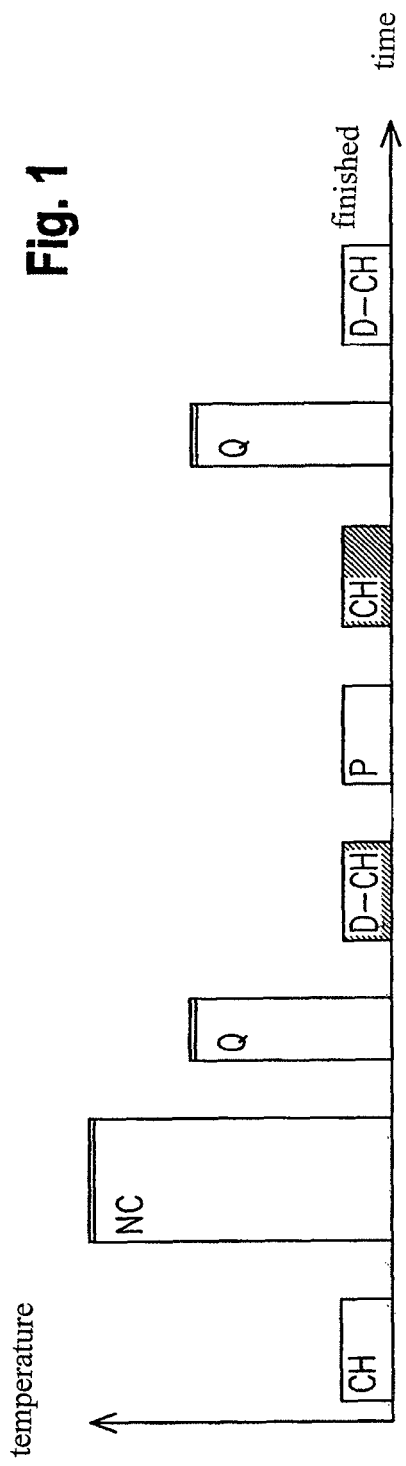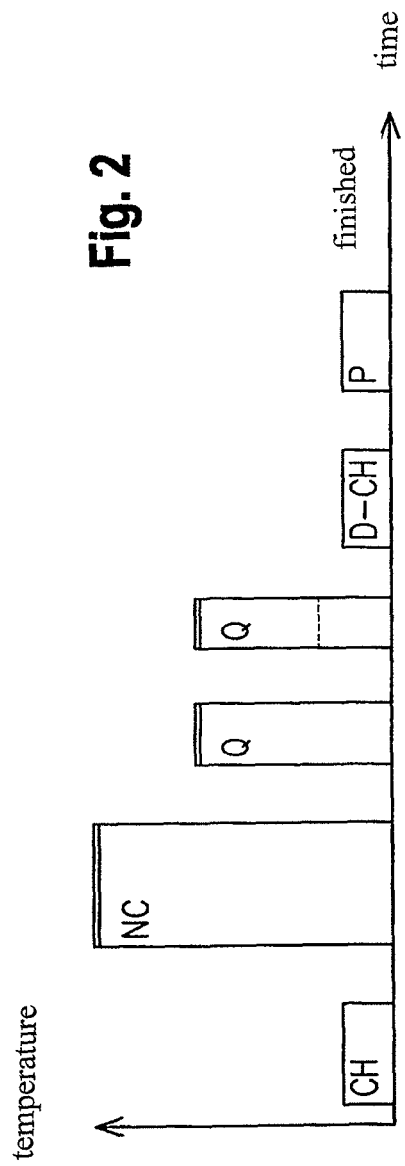

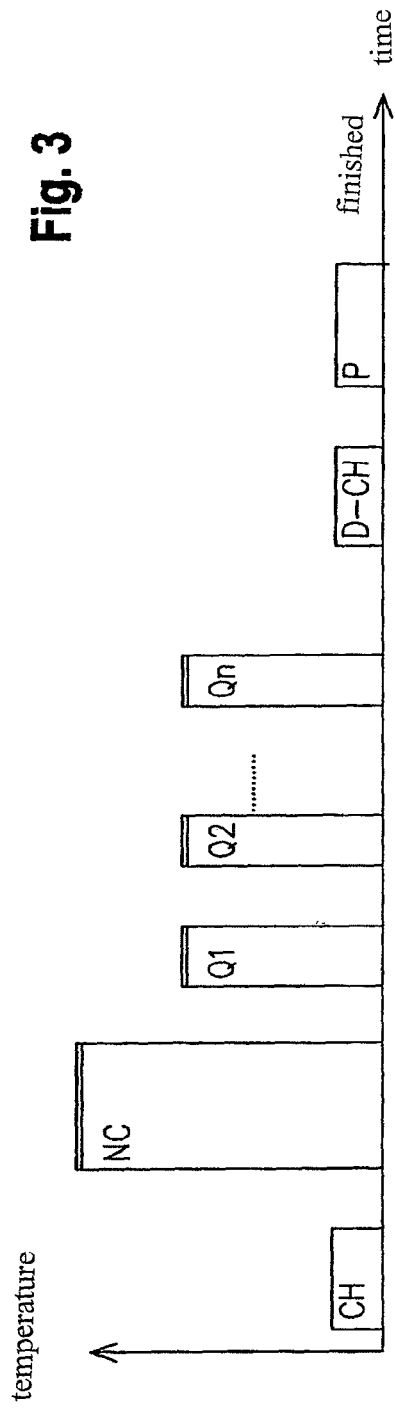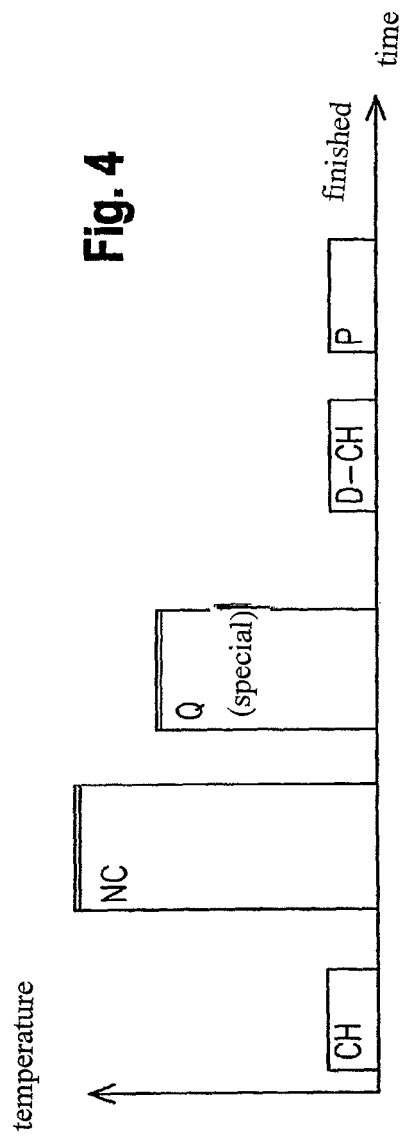

METHOD FOR PRODUCING CORROSION-RESISTANT SURFACES OF NITRATED OR NITROCARBURATED STEEL COMPONENTS

The invention relates to a method for producing corrosion-resistant surfaces of nitrated or nitrocarburated steel components.

The process of nitrating and nitrocarburating of steel surfaces has been used for decades to increase the wear resistance and the fatigue strength of steel components. Thousands of applications for use are known, for example the nitrating of crankshafts and the nitrocarburating of cam shafts for the manufacturing of automobiles.

The nitrating and nitrocarburating processes are very similar. In the case of nitrating, the element nitrogen is introduced into the component surface while in the case of nitrocarburating, nitrogen and to a lesser degree also carbon are diffused into the component surface. The processes are normally realized at temperatures between 540 and 630° C., in most cases between 580 and 610° C. As a result of the shorter processing times, the nitrocarburating process has gained wider acceptance in industrial technology. The nitrocarburating can be carried out in gases, in plasma or in molten salts.

During then nitrocarburating process, a compact layer of iron nitride forms on the component surface which—provided the steel is an alloy—also contains nitrides and carbonitrides from the alloying elements. This layer is referred to as a "compound layer." Besides an underneath positioned diffusion zone, this compound layer is primarily responsible for increasing the hardness, the viscosity and the wear resistance. The thickness of the compound layer depends on the material used, the duration of the processing period and the temperature and normally measures approximately 20 µm. In the outer region, the compound layer is always porous, meaning it is interspersed with fine pores. This so-called pore zone generally extends to a depth of 10-50% of the thickness of the compound layer. With a compound layer thickness of 20 µm, we generally have a pore zone of 2 to 10 µm.

It is a known fact that nitrated or nitrocarburated steel surfaces have high corrosion resistance in addition to the aforementioned wear resistance if the nitrocarburating step is followed by an oxidation of the surfaces. As a result of the oxidation, the compound layer is coated with a thin, compact iron oxide layer for which the thickness can range from fractions of a micrometer to several micrometers. The pores of the compound layer are furthermore filled with iron oxide. A passive layer is thus generated on the nitrocarburated surface which consists primarily of the black iron oxide magnetite ($Fe_3O_4$) and provides the component with high corrosion, resistance.

The oxidation of nitrocarburated layers can be achieved using gases such as carbon dioxide, nitrogen oxide or water vapor. Molten salts can furthermore also be used for the oxidation, wherein salt mixtures consisting of alkali hydroxides, alkali nitrates and alkali nitrites as well as alkali carbonates are used in most cases.

Components subjected to this type of treatment, meaning nitrocarburated and oxidized components, show a noticeable increase in the corrosion resistance in addition to the increased wear resistance. For example, the corrosion resistance of non-alloyed steel C15—as measured according to the Standard DIN EN ISO 9227: 2006—was increased from 1 hour to 12-24 hours with the use of a 1% cooking salt solution at 35° C. for nitrocarburating the surface in molten salts. If the component surface is additionally oxidized following the nitrocarburating, however, the corrosion resistance is increased even further to values of 500 h and more, thus exceeding the corrosion resistance of most galvanically deposited layers such as nickel or hard chrome which are used for similar purposes. In addition, the nitrocarburated and then oxidized layers have a pleasantly decorative, black color.

In addition to these positive aspects of the nitrocarburating and oxidizing of steel surfaces, however, problems also occur which are frequently overlooked.

The roughness of the functional surfaces of many components—such as hydraulic cylinders, gas pressure springs, ball pins, ball joints, pneumatic cylinders—cannot exceed a certain roughness value. However, the roughness of the component surfaces is increased as a result of the nitrating and/or the nitrocarburating processes. The subsequent oxidation increases the roughness only insignificantly. As a measure for the roughness and/or the change in the roughness of a surface, it has proven useful to measure the Rz value which is also referred to as maximum roughness profile height and is measured according to the Standard DIN EN ISO 4287. The permissible roughness limit for the aforementioned components is set for a roughness value (Rz) of 1.5 µm.

The following is valid as a rule of thumb for components used in the field of hydraulics, pneumatics or in gas pressure springs:

The roughness value of components used in these functional areas should not exceed Rz=1.5 µm. In general, the roughness values for these types of components fall even below 1.0 µm Rz.

Practical experience has taught us that a starting roughness value of 0.5 to 1.5 µm Rz for an untreated component is increased to twice or three times the value as a result of the nitrocarburating in molten salts and is increased to four times the original Rz value by the subsequent oxidation step. For example, original values of Rz=1 µm are increased to Rz=3 µm following the nitrocarburating and to Rz=3.5-4 µm after the nitrocarburating and oxidation.

The roughness must then be reduced again through polishing of the components to the required Rz value below 1.5 µm and in most cases below Rz=1 µm, wherein the following steps are taken in industrial technology to achieve this goal:

Following the nitrocarburating in molten salts consisting of cyanate, cyanide and carbonate, the component is transferred to an oxidizing molten bath composed of alkali hydroxide, alkali carbonate, alkali nitrate and alkali nitrite in which it is oxidized on the surface. At the same time, all adhering residues resulting from the nitrocarburating molten bath are also oxidized, meaning the cyanate and small amounts of cyanide which adhere to the components which are nitrocarburated in the molten salt bath are then oxidized to carbonate. Subsequently, the components are quenched in water. At that point, they already have the desired black color, wear resistance, and corrosion-resistance. However, as described before, the roughness is still too high with double, triple or even four times the value of the starting roughness. The components are therefore removed from the loading frames and are polished. In the process, the roughness of the oxidized surface is again reduced to meet requirements, to approximately Rz=1 µm or less by using polishing discs or polishing belts, blasting the surface with glass beads, or deburring the surface with polishing stones in vibration-polishing machines.

However, the polishing operation removes a portion of the corrosion-resistant passive layer, whereupon the corrosion resistance of the layer remaining after a one-time oxidation and polishing no longer meets the requirements. The nitrated, oxidized and polished component is therefore again placed onto the loading frame and is submerged for a period of 15 to 60 minutes, in most cases 30 minutes, into the oxidizing molten salt bath. In the process, the surface affected by the polishing is again oxidized and so-to-speak repaired. The second oxidation process takes place in the same molten salt bath which was used for the first oxidation. The second oxidation does not significantly increase the roughness since the pores have already been oxidized and the peaks of the compound layer have already been removed. Following the second oxidation, the components are again quenched in water, if necessary are wiped off with the aid of felt discs or cloths and without abrasive media, respectively are cleaned of water spots and dirt adhering to the surfaces, and are then oiled. Following this, the components are ready to be installed. In the technical field, this process is referred to as QPQ process. The abbreviation stands for quench-polish-quench, wherein the "Q" in this case respectively refers to the oxidation in an oxidizing molten salt bath.

For ball joint pins or piston rods used in gas pressure springs, this process results in excellent corrosion resistance and sufficiently smooth and wear-resistant surfaces with roughness values of Rz<1.5 µm, in most cases even below 0.7 µm.

However, this method which until now has been the standard for use on an industrial scale has one prominent economic disadvantage. Following the oxidation of the surface, the components must be removed from the loading frames and fitted onto polishing machines. Once the polishing step is completed, the components must again be cleaned and placed back onto the loading frames—for the most part manually— so that they can undergo the second oxidation step in the QPQ process sequence.

It is the object of the invention to provide an efficient procedure for generating nitrated or nitrocarburated components with corrosion-resistant surfaces that have low roughness.

This object is solved with the features disclosed in claims 1 and 14. Advantageous embodiments and useful modifications of the invention are described in the dependent claims.

According to a first variant of the invention, the method for producing corrosion-resistant surfaces of nitrated or nitrocarburated steel components comprises the following method steps, wherein the surfaces have roughness profile heights Rz with Rz≥1.5 µm: oxidation of the surfaces of the nitrated or nitrocarburated components during a first oxidation step; realizing at least one second oxidation of the component surfaces during an immediately following oxidations step; polishing of the component surfaces in a final method step that immediately follows the last oxidation step.

According to a second variant of the invention, the method for producing corrosion-resistant surfaces of nitrated or nitrocarburated steel components comprises the following methods steps, wherein the surfaces have roughness profile heights Rz with Rz≤1.5 µm: oxidation of the surfaces of the nitrated or nitrocarburated components in a lithium-ions containing molten salt bath; polishing of the component surfaces in a final method step that immediately follows the oxidation step.

Both variants of the invention result in an efficient production of corrosion-resistant surfaces with low roughness heights for nitrated or nitrocarburated steel components. This is based on the fact that the polishing of the component surface forms exclusively the last method step of the surface processing. The components therefore must only be loaded once onto the frames, wherein the components are not only nitrated or nitrocarburated on these frames, but all oxidation steps for producing the corrosion-resistant surfaces are also carried out thereon. Following the unloading of the components, it is therefore only necessary to realize the polishing step as the final processing step.

In contrast to the QPQ method known from the prior art, which also serves to produce corrosion-resistant component surfaces with low roughness, the oxidation treatments no longer need to be interrupted by polishing steps, so that the multiple loading and unloading of the components, required until now, can be omitted.

The method according to the invention leads to a reduction in the processing time of approximately 25% and a cost savings of 20 to 35% as compared to the QPQ processing sequence which delivers the same results with respect to roughness and corrosion resistance.

A precondition for the method according to the invention is the use of suitable oxidizing media which produce a sufficiently strong, dense and fixedly adhering oxide layer on the components, meaning a chemical passive layer, so that a polishing step that follows the oxidation of the nitrated or nitrocarburated surface no longer results in a reduction of the corrosion resistance and an oxidation after the polishing is consequently no longer necessary.

The first variant of the invention takes the form of a QQP process or in general a Q"P process, for which the nitrating or nitrocarburating step is followed immediately by a second oxidation process (Q=quench) or in general by n additional oxidation processes, wherein the last oxidation step is immediately followed by the final polishing process (P=polish).

For the nitrocarburating of component surfaces in molten salt baths (salt melt), it is advantageous if the first oxidation, which is coupled with a detoxification reaction, is followed by a second oxidation in a different, separate molten salt bath or in a strongly oxidizing, watery, alkaline medium. In the process, the chemical composition of the second oxidation bath can differ from that of the first oxidation bath. In the case of gas-supported or plasma-supported nitrocarburating methods, the oxidizing media are mostly water vapor or mixtures of water vapor, oxygen, ambient air, or carbon dioxide. The processing parameters of the oxidizing media can differ, in particular the residence time and the temperature. The reason for generating a surface that can be polished must be seen in that as a result of the successively following, multiple oxidation steps ($Q_1$-$Q_n$), the developing passive layer of $Fe_3O_4$ adheres increasingly stronger to the component surface and that pores contained in the $Fe_3O_4$ itself are closed by the multiple, directly following oxidations.

The second variant of the invention represents a QP process, meaning it is possible with this variant to use only a single oxidation. It is absolutely necessary for this that the oxidizing medium is a molten salt bath and contains lithium ions ($Li^+$), preferably at a concentration of at least 0.25 to 9.0%. Preferred is a concentration of lithium ions of 1 to 2% by weight in the aforementioned oxidizing medium. The lithium ions are preferably introduced in the form of the following salts: lithium carbonate ($Li_2CO_3$), lithium nitrate ($LiNO_3$) or lithium chloride (LiCl). Not only the iron oxide $Fe_3O_4$ forms on the component surface if lithium ions are present in the oxidizing medium, but also a mixture of $Fe_3O_4$ with oxides and double oxides of the lithium, for example $Li_2Fe_3O_5$, $Li_2Fe_2O_4$ and $Li_2FeO_2$. This surface, which is composed of mixed oxides, forms a particularly dense, fixedly adhering surface that can be polished, wherein it is possible as a result of the polishing to produce a maximum roughness profile height of Rz<1.5 µm, without loss of the corrosion-resistance of this surface.

The method according to the invention is generally suitable for producing corrosion-resistant surfaces with low roughness for steel components. These components can be embodied as cylinders, dies, or pipes used in hydraulic systems. The components can furthermore be embodied as ball pins, ball joints or piston rods for use in gas pressure springs or pneumatic systems.

The invention is explained in the following with the aid of the Figures and examples, showing in:

FIG. 1: The processing sequence for the QPQ process known from the prior art;

FIG. 2: The processing sequence for a QQP process according to the invention;

FIG. 3 The processing sequence for a Q″P process according to the invention;

FIG. 4 The processing sequence for a QP process according to the invention.

FIG. 1 schematically shows the processing sequence for the QPQ process that is known from the prior art for producing corrosion-resistant surfaces with low roughness heights for nitrocarburated steel components.

The following abbreviations are used in FIG. 1 as well as in the subsequent FIGS. 2 to 4 for the individual method steps shown therein.
CH loading of components onto the frames;
NC nitrocarburating or nitrating of the components
Q, $Q_1$ to $Q_n$ oxidizing of the components
D-CH unloading/removal of the components from the frames;
P polishing of the components.

FIGS. 1 to 4 in this case qualitatively show the temperatures for the individual method steps.

For the method illustrated with FIG. 1, the components are initially loaded onto frames, which is also referred to as charging (CH) of the components. Following this, the components are nitrocarburated (NC) and then oxidized (Q) in a following method step. This is followed by an unloading (D-CH) of the components, meaning they are removed from the frames so that they can be polished (P) in a subsequent method step. As a result, the roughness heights of the surfaces can be reduced to <1.5 μm which, however, is tied to a reduction in the corrosion resistance of the component surfaces. Thus, the components must again be loaded onto the frames for a follow-up treatment, so that they can be subjected once more to another oxidation treatment (Q).

FIG. 2 shows a first embodiment of the method according to the invention which represents a QQP process. In a first step, the components are loaded (CH) onto the frames which is followed by the nitrocarburating (NC) of the components. Immediately thereafter, two oxidation processes (Q) are realized, meaning the components are oxidized during two successively following oxidation steps. This is followed by the unloading (D-CH) of the components and the subsequent polishing (P) of the components. As a result of the polishing, roughness heights of Rz<1.5 μm are achieved for the component surfaces. Owing to the two previously realized oxidation steps, sufficiently strong, dense and adhering oxidation layers are produced on the component surfaces, so that the polishing of the component surfaces will not noticeably reduce the corrosion resistance. Another oxidation step following the polishing step is therefore no longer required, meaning the polishing step is the last step for this method. As a result, the intermediate steps of unloading and loading after the polishing operation (shown with hatched lines in FIG. 1), which are still required with the QPQ method, can be omitted, thereby resulting in considerable savings in time and costs.

The second exemplary embodiment of the method according to the invention, shown in FIG. 3, represents a Q″P process. This method differs from the embodiment shown in FIG. 2 only in that n oxidation steps $Q_1 \ldots Q_n$ in place of two oxidation steps follow immediately after the nitrocarburating of the components. The intermediate steps of unloading prior to the polishing and loading after the polishing (shown with hatched lines in FIG. 1), which are still required when using the QPQ method shown in FIG. 1, are also omitted with this Q″P process.

With the method according to FIGS. 2 and 3, molten salt baths can be used for realizing all oxidation steps (meaning for both Q processes shown in FIG. 2 and the processes $Q_1 \ldots Q_n$ in FIG. 3).

The molten salt baths for the individual oxidation steps can have different compositions. In that case, the processing conditions for the oxidation steps can be identical or different.

Alternatively, molten salt baths with identical compositions can also be used for the individual oxidation steps, wherein the oxidation steps will then differ with respect to the processing conditions, in particular the residence time and the temperature.

The molten salt bath for realizing an oxidation step in connection with the aforementioned methods is advantageously composed of the following constituents:
10-50% by weight of $NaNO_3$
0-40% by weight of $KNO_3$
0-20% by weight of $NaNO_2$,
20-70% by weight of NaOH
0-60% by weight of KOH
3-30% by weight of $Na_2CO_3$
3-30% by weight of $K_2CO_3$
0-10% by weight of $Li_2CO_3$ It is particularly advantageous if the molten salt bath is composed of the following constituents:
5-15% by weight of $NaNO_3$
1-15% by weight of $NaNO_2$
20-30% by weight of NaOH
0-60% by weight of KOH
20-40% by weight of $Na_2CO_3$ The residence time for realizing the oxidation steps preferably ranges from 5 to 120 minutes and, especially preferred, ranges from 30 to 40 minutes. The temperature is advantageously in the range between 300° C. and 500° C., especially advantageously between 380° C. and 430° C.

According to one alternative embodiment of the method, illustrated in FIGS. 2 and 3, a molten salt bath can respectively be used for the first oxidation step and a strongly oxidizing, alkaline watery medium such as a browning bath or similar medium can be used for the additional oxidation step or steps.

This watery medium is advantageously composed of the following constituents:
35-60% by weight of water
3-15% by weight of $NaNO_3$
1-10% by weight of $NaNO_2$
0-5% by weight of CaCl
0-5% by weight of sodium thiosulphate
30-50% by weight of NaOH
30-50% by weight of KOH
0-5% by weight of LiCl
0-5% by weight of $Li_2NO_3$
0-5% by weight of $Na_4P_2O_7$ It is particularly advantageous if the watery medium is composed of the following constituents:
40-50% by weight of water
5-10% by weight of $NaNO_3$
1-5% by weight of $NaNO_2$
0.5-2% by weight of NaCl
0.5-2% by weight of sodium thiosulphate
40-45% by weight of NaOH The watery medium is kept in a boiling state, at a temperature between 120° C. and 160° C. and especially advantageously between 135° C. and 140° C. The treatment period for the components thus ranges from 5 to 120 minutes and especially advantageously lasts 30 minutes.

FIG. 4 shows a variant of the method according to the invention in the form of a QP process. The method according to FIG. 4 differs from the method according to FIG. 2 in that instead of two oxidation steps, a single oxidation step (Q) of the component only is to be realized. Even though only one oxidations step is realized prior to the polishing step (P), the components need not be oxidized again after the polishing step.

This is based on the fact that the oxidation step for the method according to FIG. 1 is carried out with the aid of a special, lithium ions containing molten salt bath. This molten salt bath contains lithium ions (Li) at a concentration of at least 0.25 to 9.0%, wherein a concentration of lithium ions of 1 to 2% by weight is preferred. The lithium ions are preferably introduced in the form of the salts lithium carbonate ($Li_2CO_3$), lithium nitrate ($LiNO_3$) or lithium chloride (LiCl). Iron oxide $Fe_3O_4$ is not the only thing that forms in the presence of lithium ions in the oxidizing medium, but also a mixture of $Fe_3O_4$ with oxides and double oxides of the lithium, for example $Li_2Fe_3O_5$; $Li_2Fe_2O_4$ and $Li_2FeO_2$. This surface, which is composed of mixed oxides, represents a particularly dense, fixedly adhering surface that can be polished, thus making it possible to obtain a maximum roughness profile height of Rz<1.5 μm as a result of the polishing, without losing the corrosion resistance of this surface.

The lithium-ions containing molten salt bath is advantageously composed of the following constituents:
20-50% by weight of $NaNO_3$
0-40% by weight of $KNO_3$
0-5% by weight of $NaNO_2$
20-60% by weight of NaOH
0-20% by weight of KOH
3-25% by weight of $Na_2CO_3$
3-15% by weight of $K_2CO_3$
1-30% by weight of $Li_2CO_3$
1-10% by weight of $Li_2NO_3$
1-10% by weight of LiCl It is particularly advantageous if the molten salt bath is composed of the following constituents:
30-40% by weight of $NaNO_3$%
2% by weight of $NaNO_2$
40-50% by weight of NaOH
3-8% by weight of $Na_2CO_3$
3-8% by weight of $K_2CO_3$
1.5-10% by weight of $Li_2CO_3$
0-2% by weight of $Li_2NO_3$ In principle, the molten salt bath used for the method according to FIG. 4 can also be used to realize the first oxidation step of the methods shown in FIGS. 2 and 3.

The following examples are used to further explain the method according to the invention.

EXAMPLE 1

104 items in the form of piston rods with a length of 18 cm and a diameter of 12 mm and composed of the material C 45, to be used in pneumatic valves, were nitrocarburated for 90 minutes in a TFI® nitrocarburating molten salt bath inside a titanium crucible, under standard processing conditions using the so-called Tenifer® process (cyanate content 37.5% by weight; cyanide content 4.2% by weight; iron content less than 200 ppm; temperature 580° C.+/−5° C.; Na+/K+ ratio of the melt approximately 20/80), in order to produce a compound layer with a thickness of 18-21 μm. The average roughness of the original components prior to the treatment was Rz=0.52 μm, measured according to DIN EN ISO 4287 on two rods in longitudinal direction and at three different locations and mathematically averaged.

Following the nitrocarburating in the molten salt bath, two rods were removed and quenched in water. The roughness of these components—measured in the same way—was increased to an average value of Rz=1.82 μm.

Following the nitrocarburating step, the remaining 102 rods were treated in an oxidizing molten salt bath having the following composition:
$NaNO_3$ 10%, $NaNO_2$ 3%, NaOH 10%, KOH 45%, $Na_2CO_3$ 32% by weight, wherein the temperature was 410° C. and the residence time was 20 minutes. Following the oxidation, the components were cooled in water and then dried. They had a dull black surface. Two rods were removed and measured, wherein the average value for the roughness was Rz=2.02 μm, measured at respectively 3 measuring locations.

The remaining 100 rods were subjected to further treatment, as shown in the following:

25 rods were polished with a super-finish polishing machine, make "Loeser," by using a fine corundum abrasive belt with a grain size of 1000 to obtain a roughness value of Rz=0.57 μm and were then subjected to the salt-spray test according to DIN EN ISO 9227. The appearance of a first rust spot on the functional surface of the component served as failure criterion. The average service life for these rods was 72 hours, determined with the aid of 23 rods and mathematical averaging, wherein none of the rods exceeded an individual service life of 196 h and the test was stopped after 196 hours.

25 rods were polished with the same polishing machine to obtain a roughness value of Rz=0.57 μm. The rods were subsequently loaded up once more and introduced again into the aforementioned oxidizing molten salt bath and oxidized for an additional 30 minutes at 420° C., were cooled once more in water and then dried. This technical procedure corresponds to a QPQ process illustrated in FIG. 1. The rods treated in this way had an average roughness value of 0.67 μm Rz and were subsequently subjected to the salt-spray test. The average service life for these rods was 496 h, measured with the aid of 23 rods and averaged mathematically, wherein a single rod had a service life of 720 h (30 days) and the test was stopped at 720 hours. For the averaging, the service life of 720 h was used for this rod. The appearance of a first rust spot on the functional surface was used as failure criterion.

50 rods were left on the loading frame after the first oxidation and were subsequently introduced into a second, oxidizing molten salt bath having the following composition:
$NaNO_3$ 30%, $NaNO_2$ 2%, NaOH 39%, $Na_2CO_3$ 20% and $Li_2CO_3$ 9% by weight. The rods were oxidized at a temperature of 425° C. for 35 minutes, were then quenched with water and dried. The rods treated in this way had an average roughness value of Rz=2.14 μm. The rods treated in this way were polished with a super-finishing polishing machine, make "Loeser," by using a fine-grain abrasion belt to obtain an average roughness value of Rz=0.62 μm. This procedure corresponds to the sequence of steps for the QQP method according to the invention, as shown in FIG. 2.

The rods were then subjected to the salt spray test according to DIN EN ISO 9227, wherein the appearance of a first rust spot on the functional surface served as failure criterion. The average service life for these rods was 498 h, determined with the aid of 48 rods and mathematical averaging, wherein the test was stopped after 720 h and 2 rods without rust spots remained in the test setup. A service life of 720 hours was used for these 2 rods when forming the average.

The above example shows that processing steps in which a nitrocarburated surface is oxidized twice successively and is polished only at the end will result in the same or even better corrosion resistance of the surfaces when these are subjected to the salt spray test than a double oxidation treatment that is interrupted by the polishing step.

EXAMPLE 2

27 piston rods made from the material C35 and having dimensions of 27 cm length and 8 mm diameter, for use as piston rods in gas pressure springs, were nitrocarburated for 60 minutes in a TF1® nitrocarburating molten salt bath inside a titanium crucible under the following processing conditions, based on the so-called Tenifer® process (cyanate content 37.5% by weight; cyanide content 4.2% by weight; iron content less than 200 ppm) at a temperature of 600° C.+/−5° C., so that a compound layer with a thickness of 18-22 µm was produced. Prior to the treatment, the average roughness value for the original components was 0.62 µm Rz, measured according to DIN EN ISO 4287 at 3 different locations on 2 rods in longitudinal direction and mathematically averaged. The piston rods were removed from the nitrocarburating molten salt bath and oxidized in an oxidizing, lithium-ions containing molten salt bath for 45 minutes at 430° C., wherein the molten salt bath had the following composition:

$NaNO_3$ 30%, $NaNO_2$ 2%, NaOH 45%, KOH 5%, $Na_2CO_3$ 5%, $K_2CO_3$ 5%, $Li_2CO_3$ 5%, $NiNo_3$ 3% by weight. Following the cooling in water and a cleaning step, the rods treated in this way had an average roughness of Rz=2.68 µm. They were initially blasted with glass beads having an average grain size of 75 µm at a pressure of 1.5 bar. The rods were then reduced through fine-grain polishing to an average roughness of Rz=0.66 µm in a polishing machine of the type "Loeser" and using a grinding belt with a grain size of 1000. This process variant corresponds to the process as shown in FIG. 4. The rods were then subjected to the salt spray test according to DIN EN ISO 9227. The appearance of a first rust spot on the surface served as failure criterion. The average service life for these rods was 420 h, determined with the aid of 25 rods and mathematically averaged, wherein the test was stopped after 720 h, with 1 rod that did not have a rust spot remaining in the test setup. The service life of 720 h was used for this rod when forming the average value.

The above example shows that when using a suitable lithium-containing molten salt bath for oxidizing the component surface, a single oxidation can already be sufficient to produce the desired corrosion-resistant surface which can be polished.

EXAMPLE 3

27 piston rods made from the material C35 and having a length of 27 cm and a diameter of 8 mm, for use as piston rods in gas pressure springs, were nitrocarburated in the same way as for the Example (2), for 60 minutes in a TF1®nitrocarburating molten salt bath inside a titanium crucible under the following processing conditions based on the so-called Tenifer® process (cyanate content 37.5% by weight; cyanide content 4.2% by weight; iron content less than 200 ppm) at a temperature of 600° C.+/−5° C., so that a compound layer with a thickness of 18-22 µm was produced. Prior to the treatment, the average roughness value of the original components was 0.62 µm Rz, measured according to DIN EN ISO 4287 at 3 different locations on 2 rods in longitudinal direction and mathematically averaged, in the same way as for the example (2). The piston rods were removed from the nitrocarburating molten salt bath and oxidized for 45 minutes at 430° C. in an oxidizing, lithium-containing molten salt bath having the following composition:

$NaNO_3$ 30%, $NaNO_2$ 1%, NaOH 40%, KOH 5%, $Na_2CO_3$ 10%, $K_2CO_3$ 5%, $Li_2CO_3$ 8% by weight. The piston rods were then quenched in water. The still wet rods were oxidized further in a boiling, oxidizing medium at 142° C. for 25 minutes, wherein the watery medium was composed of the following constituents: water 39%, $NaNO_3$ 10%, $NaNO_2$ 3%, NaCl 1%, $Na_2S_2O_3$ 1%, NaOH 45%, $LiNO_3$ 1% by weight. The rods were subsequently removed, washed and dried. Following this, the rods were polished finely in a polishing machine of the type "Loeser," using a grinding belt having a grain size of 1000 to obtain an average roughness value of Rz=0.72 µm. This method variant corresponds to the method illustrated in FIG. 2. The polished rods were then subjected to the salt spray test according to DIN EN ISO 9227. The appearance of a first rust spot on the surface served as failure criterion. The average service life of these rods was 414 hours, determined with the aid of 25 rods and mathematical averaging, wherein the test was stopped at 500 h and 1 rod without rust spot remained in the test setup. A service life of 500 h was used for this rod when forming the average.

TFI® and Tenifer® are registered trademarks of the company Durferrit GmbH, Mannheim.

The invention claimed is:

1. A method for producing corrosion-resistant surfaces of nitrated or nitrocarburated steel components, wherein the surfaces have roughness profile heights Rz of Rz≤1.5 µm, said method comprising the following method steps: oxidizing the surfaces of the nitrated or nitrocarburated components in a first oxidation step; further oxidizing the component surfaces during at least one immediately following oxidation step, wherein the first and the at least one immediately following oxidation steps use respective first and second molten salt baths that have different compositions from one another and the oxidation steps have identical or different processing conditions:

wherein the first molten salt bath comprises:
20-50% by weight of $NaNO_3$
0-40% by weight of $KNO_3$
0-5% by weight of $NaNO_2$
20-60% by weight of NaOH
0-20% by weight of KOH
3-25% by weight of $Na_2CO_3$
3-15% by weight of $K_2CO_3$
1-30% by weight of $Li_2CO_3$
1-10% by weight of $Li_2NO_3$; and
1-10% by weight of LiCl
and wherein the second molten salt bath comprises:
10-50% by weight of $NaNO_3$
0-40% by weight of $KNO_3$
0-20% by weight of $NaNO_2$
20-70% by weight of NaOH
0-60% by weight of KOH
3-30% by weight of $Na_2CO_3$
3-30% by weight of $K_2CO_3$; and
0-10% by weight of $Li_2CO_3$; and
polishing the surfaces in a final processing step that immediately follows a last oxidation.

2. The method according to claim 1, wherein when more than two oxidation steps are realized, all oxidation steps are carried out immediately following each other.

3. The method according to claim 1, further comprising using a residence time between 5 and 120 minutes, and a temperature between 300° C. and 500° C. for realizing at least one of the oxidation steps in a molten salt bath.

4. A method for producing corrosion-resistant surfaces of nitrated or nitrocarburated steel components, wherein the surfaces have roughness profile heights Rz of Rz≤1.5 µm, said method comprising the following method steps: oxidizing the surfaces of the nitrated or nitrocarburated components in a first oxidation step; further oxidizing the component surfaces during at least one immediately following oxidation step, wherein the first and the at least one immediately following oxidation steps use respective first and second molten salt baths that have different compositions from one another and the oxidation steps have identical or different processing conditions:

wherein the first molten salt bath comprises:
20-50% by weight of $NaNO_3$
0-40% by weight of $KNO_3$
0-5% by weight of $NaNO_2$
20-60% by weight of NaOH
0-20% by weight of KOH
3-25% by weight of $Na_2CO_3$
3-15% by weight of $K_2CO_3$
1-30% by weight of $Li_2CO_3$
1-10% by weight of $Li_2NO_3$; and
1-10% by weight of LiCl
and wherein the second molten salt bath comprises:
5-15% by weight of $NaNO_3$
1-15% by weight of $NaNO_2$
20-30% by weight of NaOH
0-60% by weight of KOH; and
20-40% by weight of $Na_2CO_3$; and
polishing the surfaces in a final processing step that immediately follows a last oxidation.

5. The method according to claim 4, wherein when more than two oxidation steps are realized, all oxidation steps are carried out immediately following each other.

6. The method according to claim 4, further comprising using a residence time between 5 and 120 minutes, and a temperature between 300° C. and 500° C. for realizing at least one of the oxidation steps in a molten salt bath.

* * * * *